Nov. 23, 1965     E. KOTTHAUS     3,218,931
METHOD AND PAIR OF CUTTER HEADS FOR THE CUTTING
OF LONGITUDINALLY CAMBERED TEETH OF A PAIR OF
BEVEL GEARS OR HYPOID GEARS WITH
LONGITUDINALLY CURVED TEETH

Filed Dec. 27, 1963     7 Sheets-Sheet 1

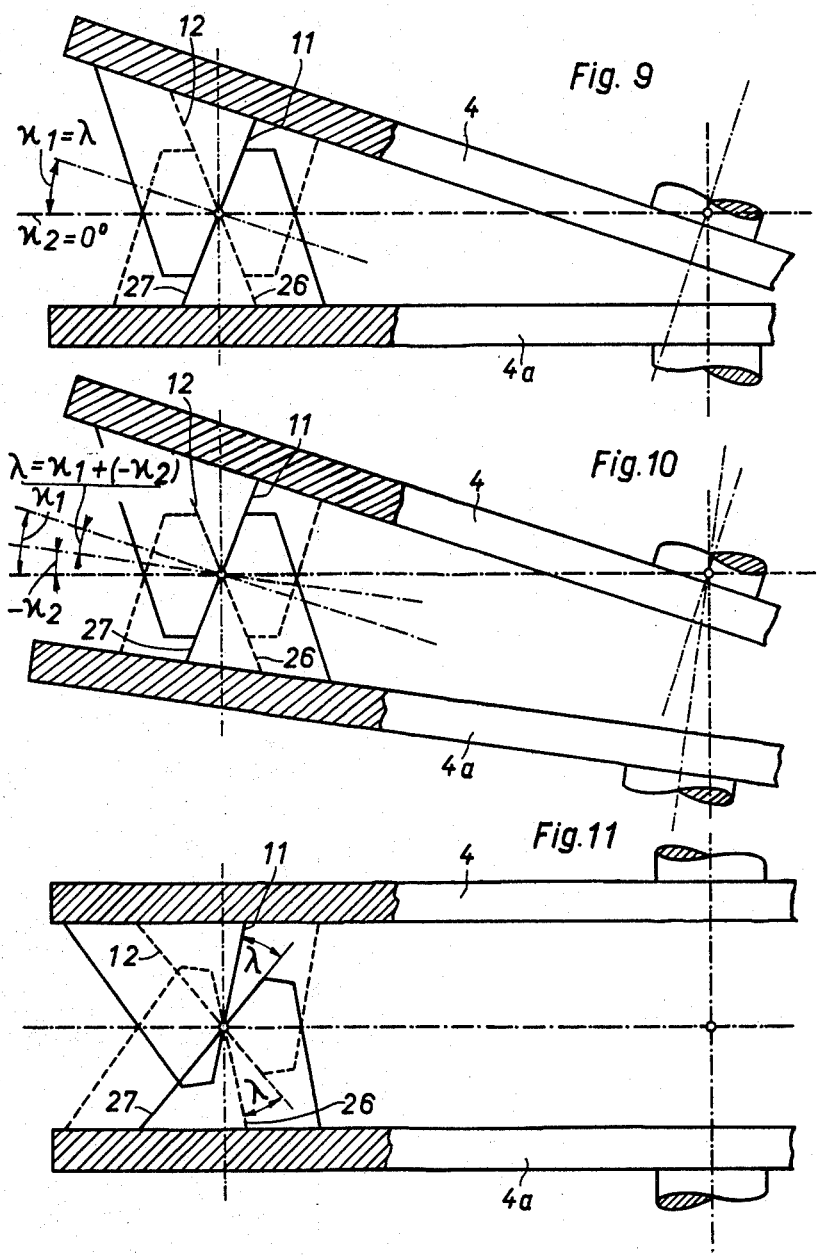

United States Patent Office 3,218,931
Patented Nov. 23, 1965

3,218,931
METHOD AND PAIR OF CUTTER HEADS FOR THE CUTTING OF LONGITUDINALLY CAMBERED TEETH OF A PAIR OF BEVEL GEARS OR HYPOID GEARS WITH LONGITUDINALLY CURVED TEETH
Erich Kotthaus, Kloten, Zurich, Switzerland, assignor to Verwaltungsgesellschaft der Werkzeugmaschinenfabrik Oerlikon
Filed Dec. 27, 1963, Ser. No. 333,801
Claims priority, application Switzerland, Jan. 7, 1963, 127/63
3 Claims. (Cl. 90—5)

The invention relates to toothing the teeth of which are to be cut so as to secure any lengthwise tooth bearing or in other words to a toothing the contour of the pinion teeth of which is determined to give full length, mid or end bedding. Such toothing will be referred to hereinafter as "longitudinally cambered toothing" for brevity.

The invention relates more particularly to a method for the cutting of a longitudinally cambered toothing of a first bevel gear or hypoid gear and of a second such gear cooperating therewith having longitudinally curved teeth of a mean normal angle of obliquity of action (pressure angle) $\alpha_{nZ}$ and $\alpha_{nT}$, respectively, of the concave and convex tooth flanks, respectively, in two separate working operations by a continuously indexing self-generating method, with the use of two rotating cutter heads, preferably having inherently straight outer and inner cutting edges, each of which lies in a cutting edge plane, which passes through the pitch point and is inclined to the corresponding pitch point radial plane of the associated cutter head and perpendicular to the common pitch plane of the two gears, the pitch points of the cutting edges of each cutter head gyrating in a pitch point plane which is pivotable with respect to the common pitch plane of the two gears, and relates moreover to a pair of cutter heads suitable for carrying out the aforesaid method.

A longitudinally cambered toothing has the object of limiting the load carrying of the teeth in their longitudinal direction for the purpose of reducing the sensitivity to the displacement of one gear relative to the other.

In a known method for the cutting of a longitudinally cambered toothing cutter heads are used, on which the pitch points of the inner and outer cutting edges are arranged on different radii in such a manner that the convex flanks of the teeth are produced at a smaller curvature than the concave flanks. Such corrections are, however, permissible under certain conditions only, so that for any definite spiral angle and for any gear size a different pair of cutter heads is required.

It has also become known for a different purpose to place the plane of the pitch points of the cutter head parallel to the direction of movement of the cutter head carriage and inclined to the pitch plane. This is the case, e.g., when a gyrating cutter without being inclined would incise the toothing of the opposite side when machining plane gears. With gears corrected in this manner careful attention is, however, to be paid to produce the opposite gear in exactly the same manner, i.e., with respect to the common double sided plane gear with the pitch point plane being inclined accurately the same angle, so that a longitudinal camber has to be produced by other means. Moreover it is known, to incline the pitch point plane of the cutter head in another direction, in order to produced teeth with increasing or diminishing total depth, without however influencing thereby the longitudinal camber.

The present invention has the object of providing a tooth cutting method of the kind described, and a pair of cutter heads for carrying out this method, which permit a free choice of the spiral angle and to produce the toothing of as many different gears as possible with one and the same arrangement of the gyrating cutting edges.

According to the invention this problem, as far as the method is concerned is solved thereby that when cutting the teeth of both gears the pitch points of the outer cutting edges and of the inner cutting edges of the opposite cutter head are guided on identical pitch point radii $r_w$ measured in the common pitch plane and that with respect to the virtual plane gear in common to the two gears when cutting teeth of the first gear (which corresponds to one side of said common plane gear), the pitch points of the outer and inner cutting edges belonging to one cutter head are guided on a pitch point plane, which with respect to the pitch point plane, on which the pitch points of the outer and inner cutting edges belonging to the other cutter head are guided, when cutting the teeth of the second gear (which corresponds to the other side of said common plane gear) is inclined about a cutter head pivot axis lying in the pitch plane, passing through the mid point P of the longitudinal tooth curve lying in the common pitch plane and standing perpendicular to the corresponding radial plane passing through the mid point P of the associated cutter head, the angle of inclination $+\lambda$ between the two pitch point planes being less than 15°, and that when machining both gears the cutting edges gyrate in such a position that when contacting the point P they lie on their path at least approximately in the corresponding normal profile plane of said plane gear apart from corrections of the cutting angle, and, with a line perpendicular to the common pitch plane include at the point P an angle, which is at least approximately equal to the angle of obliquity of action (pressure angle $\alpha_{nZ}$ and $\alpha_{nT}$, respectively, of the toothing, and none of the pitch point planes is inclined more than 15° to the common pitch plane.

As regards the pair of cutter heads the invention for carrying out the method described consists in that each outer cutting edge or inner cutting edge, respectively, of one cutter head, as projected perpendicular to the cutting edge plane on to the corresponding pitch point radial plane and a likewise projected inner cutting edge and outer cutting edge, respectively, of the other cutter head, include between them and angle λ, the two cutter heads being assumed to lie coaxially and opposite and with their pitch point plane coinciding in such a maner, that also the pitch points of one outer and one inner cutting edge of each coincide with one another.

The method disclosed hereinabove and the characterised pair of cutter heads for attaining a cambered load carrying tooth contact allow the use of a method of calculation for generating spiral-toothed bevel gears or hypoid gears, which offer much greater freedom in the layout of the toothing data.

Moreover it is possible according to the new method to cover with a single pair of cutter heads according to the invention the whole working range of a tooth cutting machine, so that the cutters which correspond to the diametrical pitch desired are only to be inserted into the tool. The diameter of these cutter heads may be chosen large, so that a high number of cutter groups can be accommodated in them.

The invention has moveover a favorable influence on the construction of the tooth cutting machine tool since owing to the use of one size of cutter heads only or at least of a low number of pairs of cutter heads with small differences in diameters the required range of rotational speeds of the machine tool can be limited and the stiffness of its gear drive can be increased.

The invention will be explained hereinafter with reference to three different embodiments illustrated by way of example in the accompanying drawings, in which:—

Figure 2:
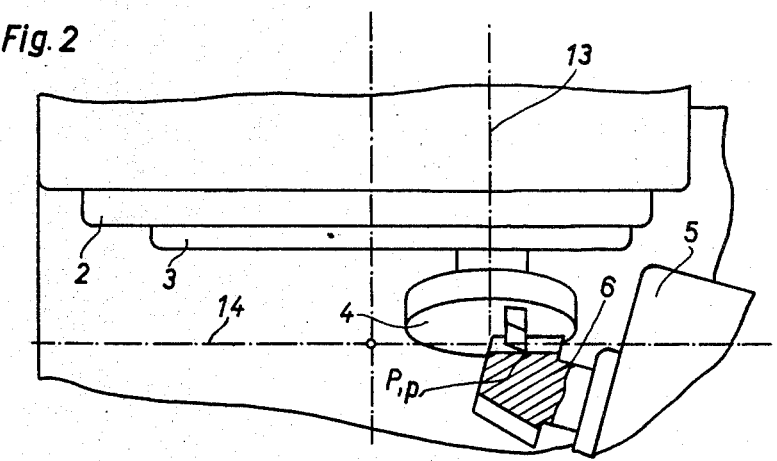
FIGURE 2 is a diagrammatic plan view to FIGURE 1, partly in section.
Figures 4, 5:
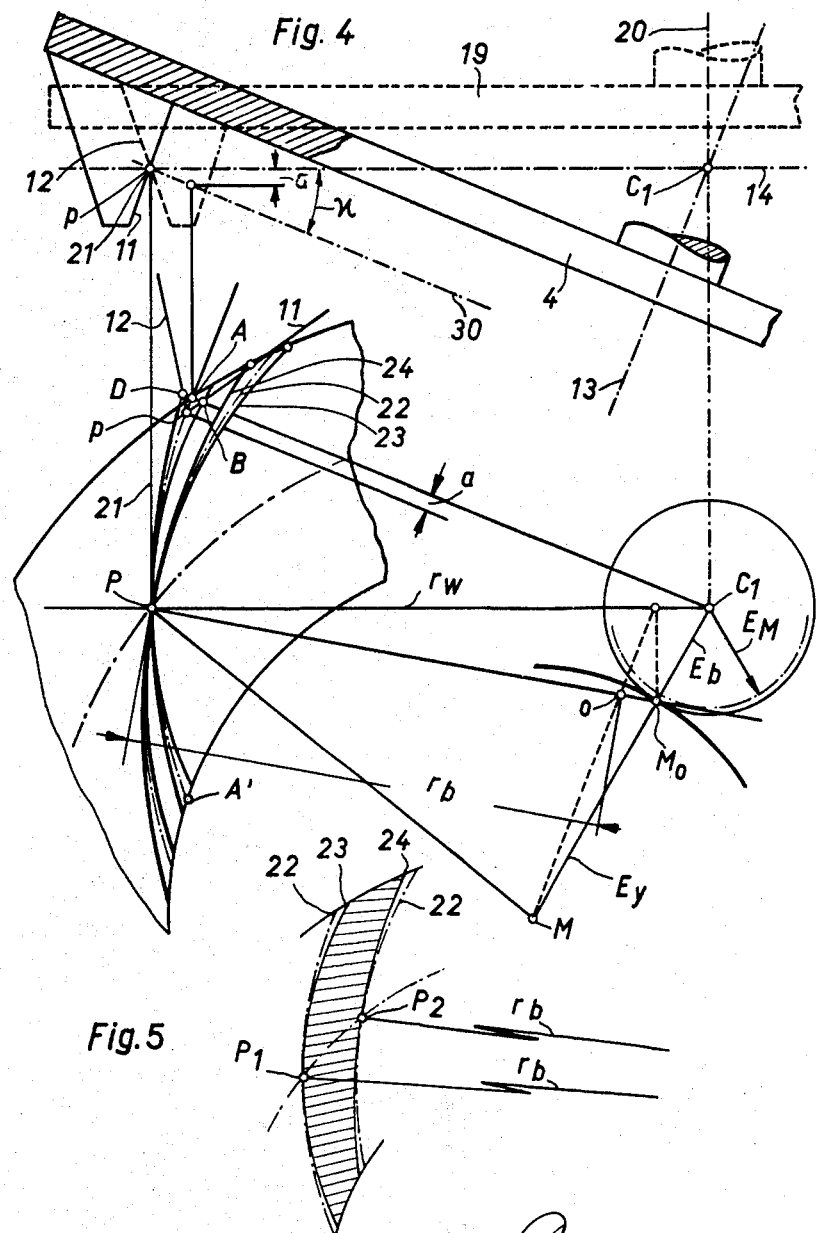
Figure 6:
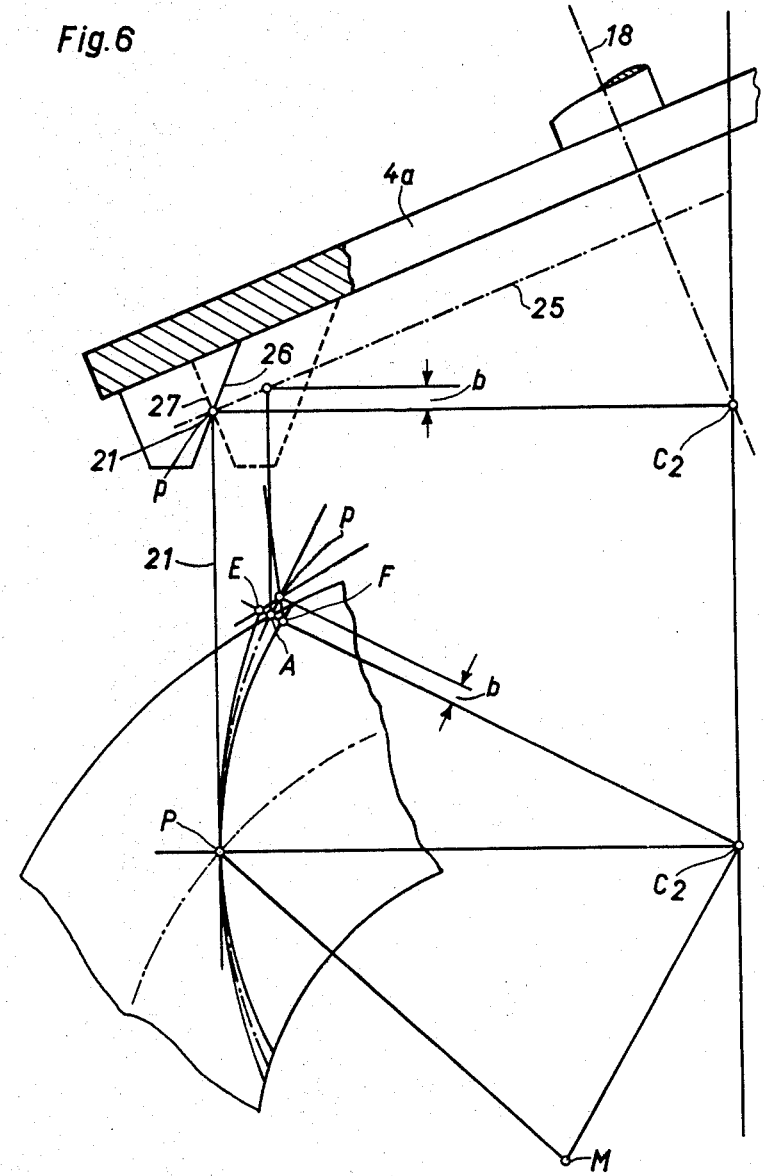
Figure 7:
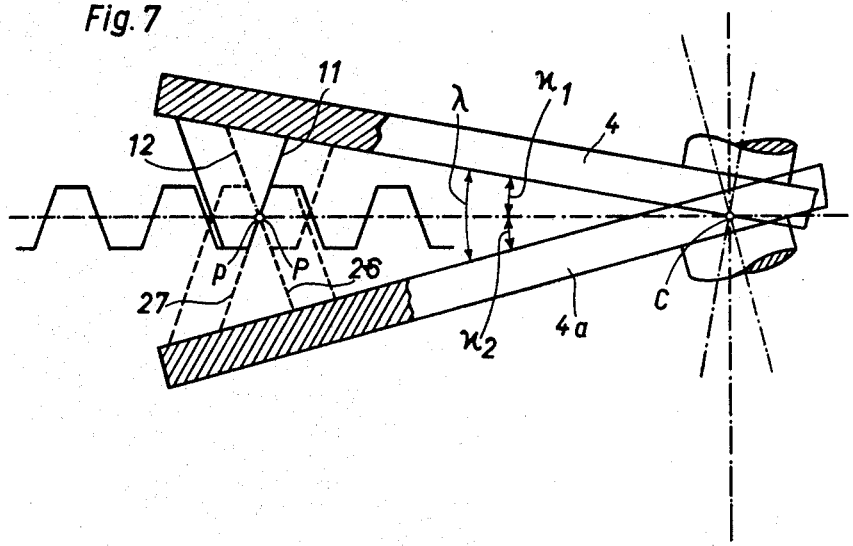
Figure 8:
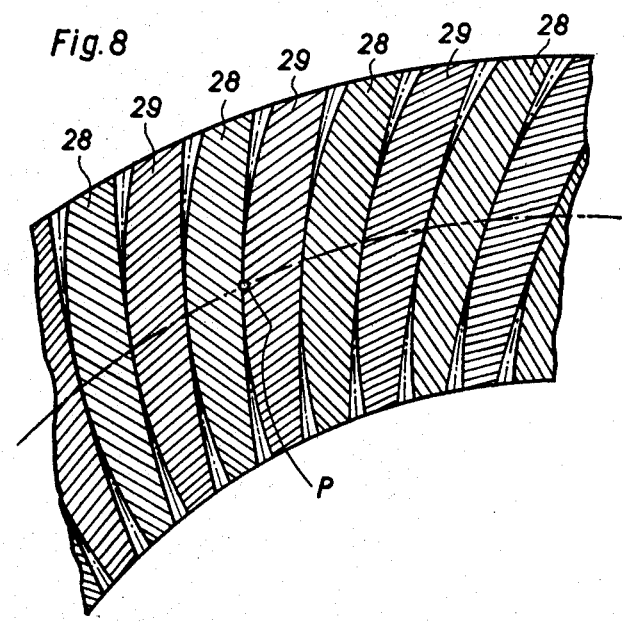
Figure 12:
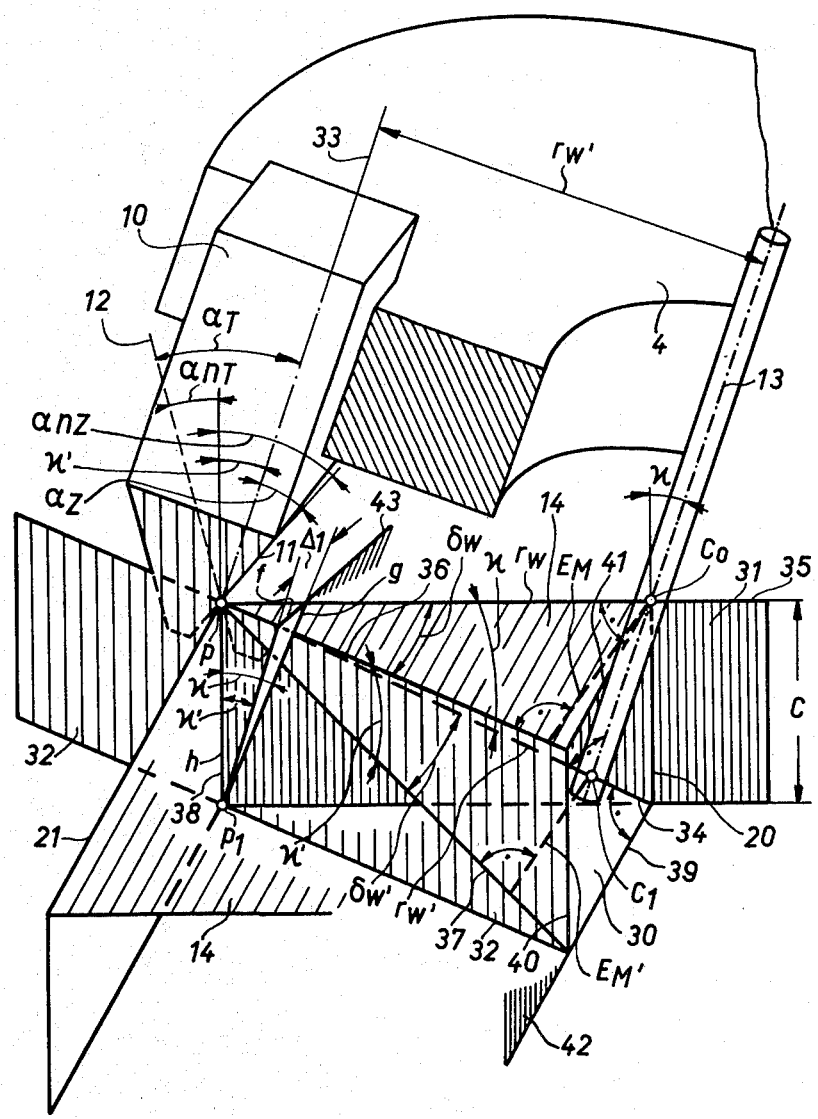

FIGURE 4 diagrammatically shows the geometrical relations in elevation and plan view between the cutting edges, guided in two different planes, of a cutter head, and of the medium longitudinal tooth curves resulting therefrom;

FIGURE 5 diagrammatically shows the shape of a longitudinal tooth section resulting from a pitch point plane inclined to the pitch plane in accordance with FIGURE 2;

FIGURE 6 diagrammatically illustrates the geometrical relations shown in FIGURE 2 for the case that the cutting edges are guided in a plane inclined opposite to that of FIGURE 2;

FIGURE 7 diagrammatically illustrates the double-sided plane gear of the co-operating pair of gears in section with the normal profile plane, in connection with the two associated cutter heads in elevation, the latter being shown in a position according to the invention relative to the double-sided plane gear, partly in section on the normal profile plane thereof;

FIGURE 8 diagrammatically shows the section with the pitch plane of the two superimposed plane gears according to FIGURE 5;

FIGURES 9 and 10 each show two cutter heads diagrammatically in elevation in their mutual position for generating their common double-sided plane gear according to FIGURE 5;

FIGURE 11 diagrammatically illustrates in elevation the two cutter heads according to FIGURE 5, which are shown orientated relative to one another in such a manner, that their axes and pitch point planes coincide;

FIGURE 12 diagrammatically shows in perspective illustration the geometrical relations of the parameters determining the position of the cutting edge relative to their axis of rotation for a pitch point plane coinciding with the pitch plane, and for a pitch point plane inclined to the pitch plane.

The explanation of the method according to the invention may start with its object, which is the production of a pair of gears with cambered load carrying contact, their cambered property being by definition and in the technological sense a feature common to both gears of the pair, which feature can be recognised only, when the two meshing gears are in contact with one another.

Accordingly the principle of the invention cannot be demonstrated by the production of a single gear, but only by the simultaneous consideration of the production of both gears. Although the two gears constituting the pair of gears are produced in two separate working operations, the desired effect is attained by the co-operation according to the invention of special measures taken in the production of each individual gear, and likewise the pair of cutter heads according to the invention is characterised by a feature which cannot be ascertained on a cutter head considered per se.

Figure 1:
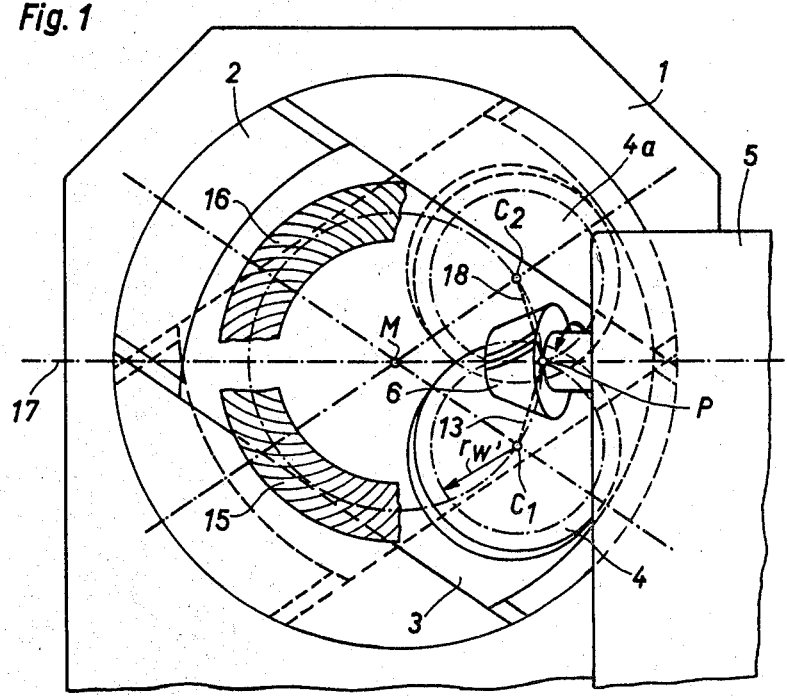
FIGURE 1 is a diagrammatic front elevation of the upper part of a gear cutting machine tool the differently inclined positions of the cutter heads for the cutting of the two gears together with the associated mirror symmetrically shaped plane gears being illustrated.
Figure 3:
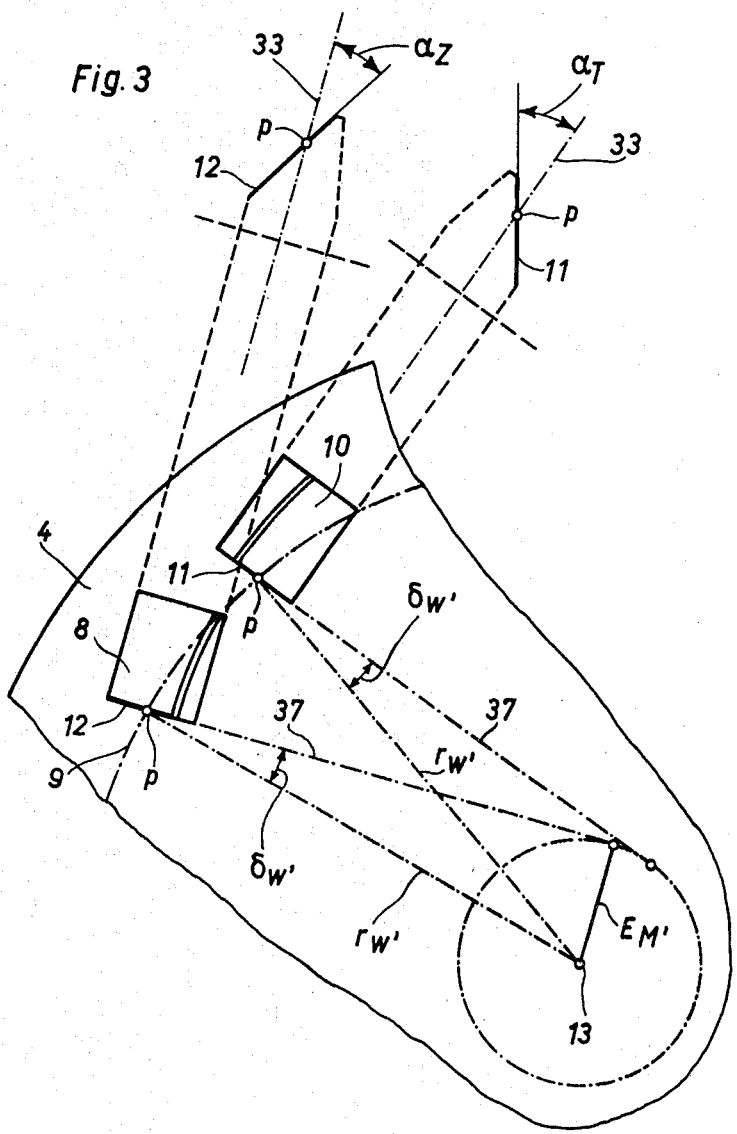
FIGURE 3 is a scrap view of a front elevation of a cutter head with two of its components shown folded into the plane of the drawing.

The principle of the invention will be firstly explained in general with reference to FIGURES 1 to 3, which for this purpose diagrammatically illustrate the most essential components of a known gear cutting machine tool previously described in the art for generating spirally toothed bevel gears or hypoid gears, and a cutter head suitable for carrying out the new method. In the slidable hobbing stock 1 the hobbing drum 2 is rotatably journaled. The latter carries on its end face the transverse carriage 3, which is slidable transversely of its axis and on which the tool in the form of a cutter head 4 is mounted rotatably and pivotally. In front of the hobbing stock 1 there is arranged pivotally the spindle stock 5, wherein the work piece in the form of a truncated cone 6 into which the teeth are to be cut. The hobbing drum 2 is turned to a certain extent during the gear cutting, in order to produce thereby the tooth profile by self-generating. In the following considerations this self-generating process is no longer referred to, and the invention will be described exclusively with reference to the generation of the medium longitudinal tooth curve, which is produced in a certain neutral position of the hobbing drum. It will be clear to any person skilled in the art that the relations described for this curve apply in an analogous manner also to the other tooth curves produced during the self-generating operation.

The cutter head 4, 4a, respectively (see also FIGURE 3) carries on the one hand cutters 8 having an outer cutting edge 12, and on the other hand cutters 10 having an inner cutting edge 11. The pitch points $p$ of the outer and inner cutting edges, respectively, i.e., those points of the cutting edges, which normally generate the medium longitudinal tooth curve, are arranged in the pitch point plane 30 on a circle 9 of the radius $r_{w'}$ lying concentrically to the axis of the cutter head. The cutting edges 11 and 12 themselves lie each in a cutting edge plane 32 (see also FIGURE 12), which passes through the pitch point $p$ and intersects the pitch point plane 30 on the section line 37. This section line 37 includes the angle $\delta_{w'}$, with the radius $r_{w'}$. The distance of the section line 37 from the axis of the cutter head 13 is denoted $E_{M'}$. As will be seen from the folded illustrations in FIGURE 3, the cutting edges 12 and 11, respectively, include an angle $\alpha_Z$ and $\alpha_T$, respectively, with an axis 33 standing perpendicular to the section line 37.

It will be shown later, how the said angles and radii are related to the given parameters of the pair of gears to be produced.

It is understood, that the method and the pair of cutter heads for the cutting of longitudinally cambered gears, which necessarily departs from the mathematical theory of geometrically correct toothing, involve small and negligible errors, so that certain mathematical relations can be kept approximately only.

In FIGURE 2 the chain-dotted line 14 indicates the pitch plane standing perpendicular to the plane of the drawing, which is common to both gears to be produced in two sparate working operations. In this common pitch plane 14 lie also the medium longitudinal tooth curves of the two virtual plane gears 15 and 16. The centre M of said plane wheels lies on the axis of the hobbing drum 2. They are mirror-symmetrical and may be made to coincide by being folded about the axis 17, so that then a common double-sided plane gear is obtained, which may be interpreted as an infinitesimally thin toothed crown.

For hypoid gears the common helical base member shall be described in the context of the present specification likewise as a "plane gear," since this common member may be likewise assumed as being plane in the region of a single medium longitudinal tooth curve, the errors involved thereby being negligible in the present consideration. Thus it is no longer necessary hereinafter to deal separately with hypoid gears since the following explanations apply likewise to them.

The production of the gears of a pair, whose teeth are to be cut, will be described hereinafter in such a manner that these two gears are produced one after the other by certain adjustments made on one and the same machine tool. Obviously it is likewise possible, to produce the gears in a different manner, for example on two separate machine tools.

When producing the first gear, the machine tool is adjusted as usual in such a manner, that the pitch plane is tangent to the pitch-cone of the gear to be cut and that the pitch points $p$ of the cutter head contact the mid point P of the longitudinal tooth curve, which belongs both to the plane gear and to the bevel gear. The axis of the cutter head 4 intersects the pitch plane in the point $C_1$. It lies in a normal plane passing through the points P and $C_1$ and perpendicular to the plane of the drawing, and is inclined in such a manner that its part lying in front of the plane of the drawing extends from the point $C_1$ in the direction of P.

In the production of the opposite gear the hobbing drum has to be turned as usual mirror-symmetrically to the line 17, and the cutter head 4 is replaced by a cutter head 4a, which apart from exceptions to be explained later, is mirror-symmetrical to the cutter head 4. In the production of the second gear the pitch points $p$ of the cutter head 4a likewise contact the mid points P of the longitudinal tooth curves in the pitch circle plane 14. The axis 18 of the cutter head 4a intersects the pitch circle plane in the point $C_2$ and in this example is inclined likewise to the normal plane through the points $C_2$ and P in such a manner that its forward part extends towards the point P.

Hereinafter it will be described in more detail how by the described inclination of the cutter heads 4 and 4a and by an appropriate choice of the aforesaid angles $\alpha_Z$ and $\alpha_T$, respectively, of $\delta_{W'}$ and of the radius $r_{w'}$ a longitudinal load carrying contact of the teeth of the two gears may be attained.

In FIGURE 4 a cutter head 4 is illustrated whose pitch point plane 30 is inclined the angle H about the pivot axis 21, in such a manner that the centre of its pitch point circle is displaced in the direction of the root of the tooth, which direction will be denoted herein as positive. In the associated plan view the plane gear is indicated in the usual manner as having the center M and the mid point P of the medium longitudinal tooth curve. The point of intersection of the cutter head axis 13 with the pitch plane 14 is again denoted $C_1$. The section line of the pitch point plane 30 with the pitch plane 14, i.e., the pivot axis of the pitch point plane 30 passes through the point P and lies at a right angle to the corresponding radial pitch point plane. Moreover an imaginary cutter head 19 is indicated in dotted lines whose pitch point plane coincides with the pitch plane 14, so that an axis 20 passing likewise through the point $C_1$ stands perpendicular to the pitch plane 14. The cutting edges 11 and 12 are assumed as belonging to the two cutter heads 4 and 19, respectively, the cutting edge being so illustrated as if it were turned into the plane of the drawing together with the cutter head. With the plane gear at a standstill and the cutter head rotating the cutting edge 11 in conjunction with the cutter head 19 generates an inter-penetration curve A'PA with the pitch plane, which curve corresponds to a circular arc having the centre $C_1$ and radius $r_w$, and passing through the point P. When also the plane gear rotates, in accordance with the usual construction of an epicycloid the point P on the radius $r_w$ rolling by means of a circle having the radius $E_b$ on a circle having the radius $E_y$, the inter-penetration curve 22 is generated, the stretch P-O on the connecting line between the point P and the instantaneous centre $M_o$ constituting the radius of curvature perpendicular to the curve 22 at the point P, the extension of which radius forms a tangent on the circle of the radius $E_M$ and accordingly has a distance $$E_M = \frac{Z_w \cdot m_n}{2}$$

from the axis of rotation 20, $Z_w$ being the number of cutter groups per cutter head, and $m_n$ the mean normal modulus of the toothing to be generated. The aforesaid formula belongs to the first principles known to a person skilled in the art of the continuously indexing method, so that it need not be dealt with in detail.

Assuming the inner cutting edge 11 as belonging to the cutter head 4, and in order not to complicate unnecessarily the following deliberations, assuming this edge 11 as lying in a radial plane, another inter-penetration curve is formed. First, with the plane gear assumed at a standstill, the pitch point $p$ moves on the pitch point plane 30, e.g., from P in the elevation of FIGURE 4 downward so that the inter-penetration proper is formed by that part of the cutting edge which, in FIGURE 4, lies above the point $p$. Considering the point A, i.e., that point at which the pitch point $p$ leaves the plane gear, it results in a vertical section folded into the plane of the drawing about the line $C_1A$, that the point $p$ has descended by a measure $a$. The inter-penetration of the edge 11 with the pitch plane accordingly takes place at the point B. Consequently an inter-penetration curve PB is formed, which has a smaller radius of curvature as compared with the inter-penetration curve PA.

Under the aforesaid assumption the same considerations may be made as regards the outer cutting edge 12. When turning the cutter head 19 again the inter-penetration curve PA is formed, while when turning the cutter head 4 the pitch point $p$ comes to lie again below the pitch plane 14. In accordance with the other inclination of the outer cutting edge 12 the inter-penetration point D is formed at the outer margin of the plane gear, i.e., an inter-penetration curve PD is formed, whose radius of curvature is larger than that of the curve PA. It is to be borne in mind that at the point P the radii of curvature of all three curves are equal, namely $r_{w'}$, so that only upon continued turning the radii of curvature of inter-penetration curves of the cutter head 4 increases or diminish.

It will be readily realised that upon rotation of the plane gear the conditions remain analogous, so that instead of the longitudinal tooth curve 22 the longitudinal tooth curve 23 is formed by the cutting edge 11, and the longitudinal tooth curve 24 is formed by the cutting edge 12, all the curves 22–24 having again the same radii of curvature $r_b$ at the point P, since as known the point O constitutes the mean centre of curvature.

Since the inner cutting edge 11 generates the convex longitudinal tooth curve 23, and the outer cutting edge generates the concave longitudinal tooth curve 24, by the use of an inclined cutter head 4 a plane gear tooth is generated, as shown in FIGURE 5 in section with the pitch plane, the tooth mid points $P_1$ and $P_2$ of the convex and concave longitudinal tooth curve, respectively, conforming with those of the plane gear cut by the cutter head 19. The tooth generated by the cutter head 4 is, however, inwardly as well as outwardly narrower than the tooth formed by the cutter head 19 as indicated in chain-dotted lines.

In FIGURE 6 a cutter head 4a is illustrated, whose pitch point plane 25 is inclined to the pitch plane 14 in the other direction denoted here as negative, so that the centre of the pitch circle is displaced in the direction of the tooth head. In the associated plan view the plane gear is likewise illustrated with the medium longitudinal tooth curve PA as it results with a parallel lying cutter head. The intersection point of the cutter head axis 18 with the pitch plane 14 is denoted $C_2$. The inclination takes place in an analogous manner about the pivot axis 21. With the plane gear at a standstill, the inner cutting edge 26 generates an inter-penetration curve PE, which has a larger mean radius of curvature than the circular arc PA. This is again to be seen in the elevation and, folded into the plane of the drawing about the line $C_2A$ in the plan view. The pitch point $p$ of the cutting edge 26 moves upward as seen in the elevation of FIGURE 6, so that the inter-penetration proper is formed by that part of the cutting edges, which lies below the point $p$.

From the illustration folded into the plane of the drawing in the plan view it follows, that the point $p$ has risen by the measure $b$. The inter-penetration of the edge 26 with the pitch plane accordingly takes place at the point E on the left hand side of the drawing. In an analogous manner the inter-penetration of the outer cutting edges 27 with the pitch plane produces a curve PF, whose mean radius of curvature is smaller than that of the circular arc PA. As will be readily realised, a negative inclination of the cutter head results in a tooth shape which in section with the pitch plane grows wider outwardly as well as inwardly.

In FIGURE 7 the conditions are illustrated, which are used for the production of a co-operating pair of gears by the aid of a pair of cutter heads. Here the manner of illustration of FIGURE 1 is used no longer, and a form has been chosen which results from turning the two plane gears in FIGURE 1 together with their associated cutter heads about the axis 17 until they coincide by being mutually superimposed and the two plane gears form the aforsaid double-sided plane gear, which is machined from either side by one of the two cutter heads forming the pair of cutter heads according to the invention. In such an illustration also the intersection points $C_1$ and $C_2$ with the pitch plane coincide in a single point C, and likewise the pivot axes 21 of the two pitch point planes with the pitch plane are identical.

In FIGURE 7 the cutter head 4 or rather its pitch point plane includes an angle $+H_1$ with the pitch plane, while the cutter head 4a includes with the latter an angle $+H_2$. The two cutter heads accordingly include in this illustration an angle $+\lambda = H_1 + H_2$ with one another. Both cutter heads are positively inclined to the pitch plane, so that the centre of their pitch circles is displaced in the direction towards the root of the associated tooth. Accordingly for both sides of the plane gear tooth shapes are formed as illustrated in FIGURE 5, i.e., teeth which grow narrower inwardly and outwardly.

In case $H_1$ is selected equal to $H_2$, the two cutter heads are mirror-symmetrical to one another. When the above condition is not fulfilled, they are distinguished by different inclinations of their cutting edges relative to their pitch point plane.

FIGURE 8 illustrates a section through the common plane gear in the pitch plane. The teeth 28 of the plane gear generated by means of the cutter head 4 as well as the teeth 29 of the plane gear generated by means of the cutter head 4a grow narrower towards their ends so that an unequivocal longitudinally cambered load carrying contact is established in the middle of the longitudinal tooth curves, while on these points, as stated, the radii of curvature of all teeth measured in the common pitch plane are equal and correspond to the magnitude $r_w$. Towards the edges of the double-sided plane wheel the play between adjacent teeth is steadily growing.

In FIGURE 9, for a second embodiment the same manner of illustration has been chosen as in FIGURE 7. Here likewise the cutter head 4 or rather its pitch point plane is inclined the angle $+H_1$ to the pitch plane, while the cutter head 4a has its pitch point plane parallel to the pitch plane, i.e., its angle of inclination $H_2=0$, and the angle $\lambda$ included between the two cutter heads becomes $H_1$. Yet a longitudinally cambered load carrying contact between the teeth is established. Transferred to FIGURE 8, the teeth 28 of the plane gear generated by the aid of the cutter head 4 remain unaltered, while the teeth 29 of the opposite plane gear assume the uncorrected shape indicated in chain-dotted lines, so that also in this case a play is generated, which steadily increases towards the edges of the double-sided plane gear the magnitude of which may be predetermined by an appropriate selection of the angle $H_1$.

The third embodiment is illustrated in FIGURE 10 likewise in the manner of FIGURE 7. The cutter head 4 is again inclined the angle $+H_1$ relative to the pitch plane 14, while the cutter head 4a is inclined the angle $-H_2$.

The angle $\lambda$ included between the two cutter heads accordingly amounts to $H_1 + (-H_2)$.

In this case the teeth 28 remain again the same as those according to FIGURE 8, while on the other hand the teeth 29 grow larger outwardly. Since however the absolute magnitude of $H_2$ is smaller than that of $H_1$ (and must be so) the outward increase in width is smaller than the corresponding reduction in width of the teeth 28, so that even in this case a play is formed, which increases towards the edges of the double-sided plane gear, the magnitude of which may be predetermined by appropriate selection of the angles $H_1$ and $H_2$.

This case may arise with very shallow bevel gears in which the tool cannot be inclined in the positive direction if interference is to be avoided, and where on the contrary the freely cutting part of the tool has to be raised by inclining the tool in the negative sense.

It is essential for the invention that on the one hand when cutting the teeth of both gears the pitch points of the outer cutting edges and of the inner cutting edges, respectively, of one cutter head, and those of the inner cutting edges and outer cutting edges, respectively, of the opposite cutter head are guided on identical pitch point radii as measured in the common pitch plane; for then only all longitudinal tooth curves meeting one another in the point P of the gear and its opposite gear have the same radius of curvature as required for a correct meshing of the teeth. On the other hand it is important, that the pitch points of the outer and inner cutting edges of each of the two cutter heads should gyrate in pitch point planes which are inclined with respect to their common plane gear an angle $+\lambda$ against one another; for then a play is generated, which increases towards the ends of the teeth. This angle shall not, however, exceed 15°, since otherwise the longitudinal camber of the teeth would become too large, and the marginal zone of the gears would become useles. None of the pitch point planes should be inclined more than 15° relative to the pitch plane in order not to lead to sources of errors, which can be neglected without difficulty with small angles only. By inclining the pitch point planes, however, the position of cutting edges should be preserved in such a manner that each of them on their path lies at least approximately in the corresponding normal profile plane of the plane gear—apart from corrections of the cutting angle—and that they include with a line perpendicular to their common pitch plane at the point P an angle, which is at least approximately equal to the pressure angle $\alpha_{nZ}$ and $\alpha_{nT}$, respectively of the toothing; for only in this manner the plane gear determined by the two gears to be produced can be generated with the pressure angles desired.

It will be later explained, that in view of this requirement the cutting edges of an inclined cutter head have quite a different inclination to the axis thereof, than those of an analogous cutter head, which is not inclined.

Assuming that the actual plane of the cutting edges of the uncorrected cutting edge coincides with the normal profile plane of the plane gear the cutting edges may be turned a few degrees only about the point $p$ in such a manner that they remain in the flank of the plane gear, in order to effect corrections of the cutting angle. The errors involved thereby are negligible.

If in FIGURE 10 the absolute magnitude of the angle $-H_2$ were equal to that of the angle $+H_1$, the cutter head axes of the opposite cutter heads would coincide. The angle $\lambda$ would then become zero. The gears of the plane gear generated by the cutter head 4 would then become narrower towards the margins exactly the same amount, as the teeth of the gear generated by the cutter head 5 increased in width, i.e., between the teeth no play would be formed at all, as it is in fact the case, when with the methods hitherto known the pair of cutter heads had to be inclined when producing a shallow bevel gear in order to obviate the danger of interference.

As soon, however, as the absolute magnitude of $-H_2$ is smaller than that of $H_1$, a small positive angle $\lambda$ is formed, and consequently also a positive play between adjacent teeth. It is unnecessary to say, that a negative angle $\lambda$ would lead to impossible conditions, since then the teeth of one gear increase in thickness towards the edges more than those of the other diminish, so that any meshing would be rendered impossible.

In order that a pair of cutter heads be suitable for producing pairs of gears according to the method described, this angle $\lambda$ of mutual inclination must be recognizable on them. This is the case when both cutter heads are illustrated in accordance with FIGURE 11 as coaxial and oppositely directed in such a manner that the pitch point planes coincide. In this case the inner cutting edges 11 and outer cutting edges 12, respectively, of one cutter head and the outer cutting edges 27 and inner cutting edges 26, respectively, of the other cutter head no longer coincide as in the FIGURES 7, 9 and 11, but they include each with one another an angle $\lambda$, assuming that the edges concerned are projected perpendicular to the plane of the cutting edges on the corresponding radial pitch point plane. This is easily explainable, if one considers that one cutter head, in order to come into the position defined, has to be turned an angle $H_1$, and the other has to be turned an angle $H_2$, so that the two formerly coinciding edges include relative to one another the angle $H_1+H_2=\lambda$.

As mentioned before, the cutting edges of a cutter head inclined an angle $+H_1$ have a quite definite position relative to the same. How this position is determined by the given parameters of the toothing and by the angle H, will be explained hereinafter.

In FIGURE 12 for example for the cutter head 4 in the pitch plane 14 of the plane gear, assumed to be horizontal, those geometric parameters are illustrated which are always used in the known methods of calculating a bevel gear.

These parameters are the pitch point radius $r_w$ which represents the distance between the intersection point $C_0$ of the cutter head axis 13 with the pitch plane 14 and the pitch point $p$ lying in the pitch plane on the inner cutting edge 11 and outer cutting edge 12, respectively, belonging to the cutter 10 and 8, respectively.

Moreover FIGURE 12 shows the orientation angle $\delta_w$ included between the radial plane 31 and the plane of the cutting edges 32 containing, e.g., the cutting edge 11, both of which stand perpendicular to the pitch plane 14 and intersect the same along the horizontal lines 36 and 35. When during the tooth cutting operation the pitch point $p$ of the cutting edge 11 is exactly at the mid point P of the medium longitudinal tooth curve as assumed in the present considerations, the plane of the cutting edges coincides with the normal profile plane of the toothing, since in this case the cutting edge must lie in the normal profile plane.

The distance of the cutting edge plane 32 and accordingly of the horizontal 36 from the point $C_0$ is denoted $E_M$. When the cutter head axis 13, as shown in FIGURE 12, in accordance with the new method is arranged on the radial plane 31 at the point $C_0$ inclined the angle H relative to the vertical axis 20, the pitch point plane 30 of the cutter head 4, which is then likewise inclined the angle H relative to the horizontal pitch plane 14 and stands perpendicular to the radial plane 31, intersects the radial plane 31 along the line 34, and the plane of cutting edges 32 along the line 37. The line 34 passes through the pitch point $p$, includes with the horizontal 35 the angle H and intersects the cutter head axis 13 at the point $C_1$, the distance of the pitch point $p$ from the point $C_1$ representing the radius $r_{w'}$, on whose associated circle all the pitch points of the cutting edges are arranged. The line 37 includes with the horizontal 36 on the cutting edge plane 32 the angle H', and with the line 34 the angle $\delta_{w'}$. The distance of the line 37 from the point $C_1$ is denoted $E_{M'}$.

When, as shown in FIGURE 12, a vertical plane 42 is placed through the point $C_0$ perpendicular to the radial plane 31, it intersects this radial plane 31 along the axis 20, the pitch point plane 30 along the line 39, the cutting edge plane 32 along the line 40, and the pitch plane 14 along the line 41. Since the pitch plane 14 as well as the pitch point plane 30 stand perpendicular to the radial plane 31, and since likewise the cutting edge plane 32 stands perpendicular to the pitch plane 14, the axis 20 and the three lines 39, 40 and 41 form with their opposite sections a rectangle, the sections of the axis 20 and of the line 40 being equal and of the length $c$.

When moreover, according to FIGURE 12, through the point $p_1$, which lies at the distance $c$ below the point $p$ on the vertical 38, a plane 43 is placed, which as measured in the radial plane 31 runs at the angle H and, as measured in the cutting edge plane 32 as the angle H' inclined to the perpendicular 38, an inter-section figure is formed with the three planes 14, 31 and 32, which is an oblique angled triangle having the side, $f$, $g$ and $h$, whose side $f$ stands perpendicular to the line 36 in the pitch plane 14, while the side $h$ in the cutting edge plane 32 includes with the side $g$ in the radial plane 31 an angle $\Delta_1$, which indicates, how much the cutting edge plane 32 deviates from the perpendicular position with respect to the pitch point plane 30.

On the cutter 10 and 8, respectively, the inner and outer cutting edges 11 and 12, respectively, include in the cutting edge plane 32 the angle $\alpha_{nZ}$ and $\alpha_{nT}$ with the perpendicular 38 through the pitch point $p$. This perpendicular 38 includes in turn the angle H' with the axis 33, which is perpendicular to the line 37, lies in the cutting edge plane 32 and passes through the pitch point $p$, so that, as will be clearly seen in FIGURE 12, the angles $\alpha_Z$ and $\alpha_T$ included with this axis by the iner and outer cutting edges, respectively, comply with the following equations:

$$\alpha_Z = \alpha_{nZ} - H' \qquad (1)$$
$$\alpha_T = \alpha_{nT} + H' \qquad (2)$$

Accordingly it is only necessary to determine the angle H' from the given parameters of the toothing, in order to fix the position of the cutting edges 11 and 12 in the cutting edge plane 32 relative to the axis 33. The position of the cutting edge plane 32 relative to the radical plane 31 is determined by the angle $\delta_{w'}$, considering that it does not lie parallel to the cutter head axis 13, but is directed the angle $\Delta_1$ away from the axis 13, while the pitch point $p$ on the pitch point plane 30, which lies perpendicular to the cutter head axis 13, lies on a circle concentrical with the axis 13 and having the radius $r_{w'}$.

Since the sections 20 and 40 are of equal length, it can be readily seen from FIGURE 12 that:

$$\tan H' = \tan H \cdot \cos \delta_W \qquad (3)$$

Since the sections 39 and 41 belong to the same rectangle as the sections 20 and 41, the sections 39 and 41 are likewise of equal length. Accordingly:

$$\tan \delta_{w'} = \tan \delta_w \cdot \cos H \qquad (4)$$

and it follows moreover from FIGURE 12 that:

$$r_{w'} = r_w \cdot \cos H \qquad (5)$$

In the oblique angled triangle $f$, $g$, $h$ of FIGURE 12 there is:

$$\cos \Delta_1 = \frac{h^2 + g^2 - f^2}{2gh}$$

wherein according to FIGURE 12.

$$h = \frac{c}{\cos H'}, \quad g = \frac{c}{\cos H}$$

and $$f = c \cdot \tan H \cdot \sin \delta_w$$

Since in practice the angles $\delta_W$ and H, and accordingly also H', are small, the angle $\Delta_1$ is very small, so that the triangle $f$, $g$, $h$, hardly differs from a rectangular triangle. Assuming moreover sin H'=sin H, one may use with sufficient accuracy for the calculation of the angle $\Delta_1$ the following relation, which is clearly seen in FIGURE 12:

$$\sin \Delta_1 \approx \sin \delta_W \cdot \sin H \qquad (6)$$

Since the cuting edge plane 32 is not parallel to the cutter head axis 13, but is inclined the angle $\Delta_1$ to it, the distances $E_M$ and $E_{M'}$ are of different magnitude. From FIGURE 12 follows that $$E_M = r_{w'} \cdot \sin \delta_{W'}$$

The accurate position of the cutting edges is unequivocally determined by the radius $r_{w'}$ and by the angles $\alpha_Z$ and $\alpha_T$ as well as be H', $\delta_{W'}$ and $\Delta_1$. The aforesaid parameters can be determined by the aid of the above relations numbered 1 to 6 from the parameters $r_{w'}$ $\delta_{W'}$, H, $\alpha_{nZ}$ and $\alpha_{nT}$ given by the toothing to be produced.

In many cases particularly when the angles H and $\delta_W$ are small, simplifications may be made in practice in the above relations, or round figures may be accepted in the results. For example cos H and cos $\delta_W$ may be assumed=1, so that when $\delta_{W'} = \delta_W$, $r_{w'} = r_w$, $\alpha_Z = \alpha_{nZ} - H$ and $\alpha_T = \alpha_{nT} + H$.

While I have herein described and illustrated in the accompanying drawings what may be considered typical and particularly useful embodiments of my said invention, I wish it to be understood that I do not wish to limit myself to the particular details and dimensions shown and illustrated.

What I claim as my invention, and desire to secure by Letters Patent is:

1. A spiral bevel and hypoid gear cutting method for the cutting of teeth having a longitudinal camber of a first gear and of a second gear cooperating therewith, said gears having a mean pressure angle $\alpha_{nz}$ and $\alpha_{nT}$ respectively, at their concave and convex flanks respectively, by a continuously indexing self-generating process, comprising the steps of separately cutting said first and second gear with the use of two rotary cutter heads having straight outer and inner cutting edges, each lying in a cutting edge plane passing through the pitch point, being inclined to the radial pitch point plane of its associated cutter head and perpendicular to the pitch plane common to both planes, the pitch points of the cutting edges of each cutter head gyrating in a pitch point plane, which is pivotal to the said common pitch plane of both said gears, the pitch points $p$ of the outer and inner cutting edges, respectively, of one of said pair of said cutter heads and those of the inner and outer cutting edges, respectively, of the opposite cutter head being guided on equal pitch point radii as measured in said common pitch plane, and in relation to a virtual plane gear common to both said gears, when cutting said first gear, which corresponds to one side of said common plane gear, the pitch points $p$ of said outer and inner cutting edges of one cutter head being guided on a pitch point plane inclined about a cutter head pivot axis to the pitch point plane, on which the pitch points $p$ of the outer and inner cutting edges of the other cutter head are guided when cutting said second gear, which corresponds to the other side of said common plane gear, said cutter head pivot axis lying in said pitch plane, passing through the midpoint P of the longitudinal tooth curve lying in said common pitch plane and standing perpendicular to the corresponding radial plane passing through the midpoint of the associated cutter head, the angle $+\lambda$ included between said two pitch point planes being smaller than 15°, said cutting edges, when machining each of said gears, gears, gyrating in such a position that each of them when contacting said midpoint P lies substantially in the corresponding normal profile plane of said virtual plane gear and includes with a line perpendicular to said common pitch plane in said midpoint P an angle substantially equal to said pressure angle substantially equal to said pressure angle $\alpha_{nz}$ and $\alpha_{nT}$, respectively, each of said pitch point planes including an angle of less than 15° with said common pitch plane.

2. A pair of spiral bevel and hypoid gear cutter heads for the separate cutting by a continuously indexing self-generating process, of teeth having a longitudinal camber of a first gear and a second gear cooperating to that of said first gear, said gears having a mean pressure angle $\alpha_{nz}$ and $\alpha_{nT}$, respectively, at their concave and convex flanks, respectively, comprising inner and outer cutting edges, an outer and inner cutting edge, respectively, projected perpendicular to the cutting edge plane on the corresponding radial pitch point plane of one of said pair of cutter heads and a likewise projected inner and outer cutting edge, respectively, of the other one of said pair of cutter heads including with one another an angle $\lambda$, said two cutter heads lying coaxially and opposite one another with their pitch point planes coinciding and with the pitch points $p$ of each outer cutting edge coinciding with those of an inner cutting edge.

3. A pair of cutter heads as claimed in claim 2, wherein at the pitch point said cutting edge plane includes an angle $\delta_W$ with the corresponding radial pitch point plane, and said cutter head is arranged pivotally about its cutter head pivot axis so as to be inclined an angle H between its pitch point plane and the pitch plane of the toothing to be generated, the outer and inner cutting edges, respectively, including an angle $\alpha_T$ and $\alpha_Z$, respectively, with an axis passing through the pitch point $p$, and lying in the cutting edge plane perpendicular to the intersetting line of said cutting edge plane with said pitch point plane of said cuttin gedges having a distance $r_{w'}$ from said cutter larger and smaller respectively, by an angle H' than said normal pressure angle $\alpha_{nT}$ and $\alpha_{nz}$, respectively, said cutting edge plane deviating with respect to said pitch point plane an angle $\Delta_1$ from the perpendicular position, the two intersection lines of said cutting edge plane and corresponding radial pitch point plane including an angle $\delta_{W'}$ with said pitch point plane, and the pitch points $p$ of said cutting edges having a distance $r_w$ from said cutter head axis, the following relations substantially applying:

$$\tan H' = \tan H \cdot \cos \delta_W$$
$$\tan \delta_{W'} = \tan \delta_W \cdot \cos H$$
$$\sin \Delta_1 \approx \sin \delta_W \cdot \sin H, \text{ and}$$
$$r_{w'} = r_w \cdot \cos H$$

References Cited by the Examiner

UNITED STATES PATENTS

| | | | |
|---|---|---|---|
| 2,978,964 | 4/1961 | Wildhaber | 90—5 |
| 3,137,206 | 6/1964 | Shinjo | 90—5 |

WILLIAM W. DYER, Jr., *Primary Examiner.*